(12) United States Patent
Nishizaka (10) Patent No.: US 9,456,138 B2
(45) Date of Patent: Sep. 27, 2016

(54) IMAGE PROCESSING APPARATUS, IMAGE PROCESSING METHOD AND COMPUTER READABLE RECORDING MEDIUM HAVING PROGRAM FOR GENERATING TIME-LAPSE MOVING IMAGE

(71) Applicant: CASIO COMPUTER CO., LTD., Shibuya-ku, Tokyo (JP)

(72) Inventor: Nobuyoshi Nishizaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 99 days.

(21) Appl. No.: 14/597,861

(22) Filed: Jan. 15, 2015

(65) Prior Publication Data

US 2015/0215537 A1 Jul. 30, 2015

(30) Foreign Application Priority Data

Jan. 30, 2014 (JP) ................. 2014-015600

(51) Int. Cl.
*G03B 15/00* (2006.01)
*H04N 5/232* (2006.01)
*H04N 5/262* (2006.01)

(52) U.S. Cl.
CPC ...... *H04N 5/23245* (2013.01); *H04N 5/23229* (2013.01); *H04N 5/2621* (2013.01)

(58) Field of Classification Search
CPC ......................... H04N 5/23245; G03B 15/00
See application file for complete search history.

(56) References Cited

U.S. PATENT DOCUMENTS

| | | | |
|---|---|---|---|
| 7,450,162 B2 | 11/2008 | Shioji et al. | |
| 7,574,129 B2 | 8/2009 | Tsukuda | |
| 8,139,106 B2 | 3/2012 | Maiya | |
| 2015/0189180 A1* | 7/2015 | Sudo | H04N 5/23245 348/222.1 |
| 2016/0112653 A1* | 4/2016 | Echigo | H04N 5/2628 348/239 |

FOREIGN PATENT DOCUMENTS

| | | | |
|---|---|---|---|
| JP | 2001298693 A | 10/2001 | |
| JP | 2004126242 A | 4/2004 | |
| JP | 2004233664 A | 8/2004 | |

(Continued)

OTHER PUBLICATIONS

Japanese Office Action (and English translation thereof) dated Apr. 21, 2015, issued in counterpart Japanese Application No. 2014-015600.

*Primary Examiner* — Tuan Ho
(74) *Attorney, Agent, or Firm* — Holtz, Holtz & Volek PC (57) ABSTRACT

The present invention provides an image processing apparatus including a shooting scene setting unit, a component image acquiring unit, and a time-lapse moving image generating unit. The shooting scene setting unit sets a shooting interval according to shooting situations or shooting setting and selects one of different methods for generating a time-lapse moving image from a plurality of images obtained at the set shooting interval according to shooting situations or shooting setting. The component image acquiring unit obtains a plurality of component images forming a time-lapse moving image based on the time-lapse moving image generating method set by the shooting scene setting unit. The time-lapse moving image generating unit generates a time-lapse moving image by using the plurality of component images obtained by the component image acquiring unit based on the set time-lapse moving image generating method.

8 Claims, 5 Drawing Sheets

(56) References Cited

FOREIGN PATENT DOCUMENTS

| JP | 2008139488 A | 6/2008 |
| JP | 4277837 B2 | 6/2009 |
| JP | 2010016599 A | 1/2010 |
| JP | 2010087778 A | 4/2010 |
| JP | 2011014970 A | 1/2011 |
| JP | 2012023497 A | 2/2012 |
| WO | 2008065751 A1 | 6/2008 |

* cited by examiner

| SHOOTING SCENE NO. | SHOOTING SCENE TITLE | GENERATING METHOD | INITIAL SHOOTING INTERVAL |
|---|---|---|---|
| 1 | STANDARD | STILL-PICTURE BASE | 1SEC |
| 2 | CLOUD | MOVING-PICTURE BASE | 5SEC |
| 3 | NIGHT VIEW | MOVING-PICTURE BASE | 3SEC |
| 4 | TWILIGHT | MOVING-PICTURE BASE | 10SEC |
| 5 | STREET | MOVING-PICTURE BASE | 1/2SEC |
| 6 | VEHICLE | MOVING-PICTURE BASE | 1SEC |
| 7 | HDR ART | MOVING-PICTURE BASE | 1/2SEC |
| 8 | TOY CAMERA | MOVING-PICTURE BASE | 1/2SEC |
| 9 | MONOCHROME | MOVING-PICTURE BASE | 1/2SEC |
| 10 | MINIATURE | MOVING-PICTURE BASE | 1/2SEC |
| 11 | FISHEYE | MOVING-PICTURE BASE | 1/2SEC |
| 12 | PARTY | MOVING-PICTURE BASE | 1/2SEC |
| 13 | STARLIT SKY | STILL-PICTURE BASE | 1MIN |
| 14 | MORNING GLORY | STILL-PICTURE BASE | 10MIN |
| 15 | FIREWORKS | STILL-PICTURE BASE | 1SEC |
| 16 | CUSTOM | STILL-PICTURE BASE | 1SEC |

FIG. 5

IMAGE PROCESSING APPARATUS, IMAGE PROCESSING METHOD AND COMPUTER READABLE RECORDING MEDIUM HAVING PROGRAM FOR GENERATING TIME-LAPSE MOVING IMAGE

CROSS-REFERENCE TO RELATED APPLICATIONS

This application is based upon and claims the benefit of priority under 35 USC 119 of Japanese Patent Application No. 2014-015600 filed on Jan. 30, 2014, the entire disclosure of which is incorporated herein by reference in its entirety for all purposes.

BACKGROUND OF THE INVENTION

1. Field of the Invention

The present invention relates to an image processing apparatus, an image processing method and a computer readable recording medium having program thereof.

2. Description of the Related Art

Conventionally, there has been known a time-lapse moving image which is one moving image obtained by photographing the shape of a subject such as growth of a plant at predetermined time intervals and shortening the time intervals between the images taken intermittently. As disclosed by Japanese Patent Application Laid-Open Publication No. 2010-16599 published on Jan. 21, 2010, a method for generating such a time-lapse moving image is performed by combining a plurality of still pictures taken at predetermined time intervals.

SUMMARY OF THE INVENTION

An image processing apparatus according to the first aspect of the present invention includes a selecting section configured to set a shooting time interval according to shooting situations or shooting setting and select one method of different methods for generating a time-lapse moving image from a plurality of images obtained at the set shooting time interval according to shooting situations or shooting setting, an image obtaining section configured to obtain a plurality of images for forming a time-lapse moving image based on the time-lapse moving image generating method selected by the selecting section, and a generating section configured to generate a time-lapse moving image from the plurality of images obtained by the image obtaining section based on the selected time-lapse moving image generating method.

An image processing apparatus according to the second aspect of the present invention includes a first image obtaining section configured to obtain images by picking out them from images forming a moving picture at every predetermined shooting interval, a second image obtaining section configured to obtain still pictures at every predetermined shooting interval, and a selecting section configured to select one of the first image obtaining section and the second image obtaining section according to a set shooting time interval as a way to obtain a plurality of images at the set shooting time interval.

An image processing method according to the third aspect of the present invention includes selecting processing for setting a shooting time interval according to shooting situations or shooting setting and selecting one method of different methods for generating a time-lapse moving image from a plurality of images obtained at the set shooting time interval according to shooting situations or shooting setting, image obtaining processing for obtaining a plurality of images for forming a time-lapse moving image based on the time-lapse moving image generating method selected by the selecting processing, and generating processing for generating a time-lapse moving image from the plurality of images obtained by the image obtaining processing based on the selected time-lapse moving image generating method.

An image processing method according to the fourth aspect of the present invention includes first image obtaining processing for obtaining images by picking out them from images forming a moving picture at every predetermined shooting interval, second image obtaining processing for obtaining still pictures at every predetermined shooting interval, and selecting processing for selecting one of the first image obtaining processing and the second image obtaining processing according to a set shooting time interval as a way to obtain a plurality of images at the set shooting time interval.

According to the fifth aspect of the present invention, a non-transitory computer-readable recording medium for recording a program readable by a computer controlling an image processing apparatus is provided. The program controls the computer to perform functions including a selecting function for setting a shooting time interval according to shooting situations or shooting setting and selecting one method of different methods for generating a time-lapse moving image from a plurality of images obtained at the set shooting time interval according to shooting situations or shooting setting, an image obtaining function for obtaining a plurality of images for forming a time-lapse moving image based on the time-lapse moving image generating method selected by the selecting function, and a generating function for generating a time-lapse moving image from the plurality of images obtained by the image obtaining function based on the selected time-lapse moving image generating method.

According to the sixth aspect of the present invention, a non-transitory computer-readable recording medium for recording a program readable by a computer controlling an image processing apparatus is provided. The program controls the computer to perform functions including a first image obtaining function for obtaining images by picking out them from images forming a moving picture at every predetermined shooting interval, a second image obtaining function for obtaining still pictures at every predetermined shooting interval, and a selecting function for selecting one of the first image obtaining function and the second image obtaining function according to a set shooting time interval as a way to obtain a plurality of images at the set shooting time interval.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are, however, exclusively for explanation and do not limit the scope of the present invention.

Here.

DETAILED DESCRIPTION OF THE PREFERRED EMBODIMENT

Hereinafter, embodiments of the present invention will be described with reference to the accompanying drawings.

Figure 1:
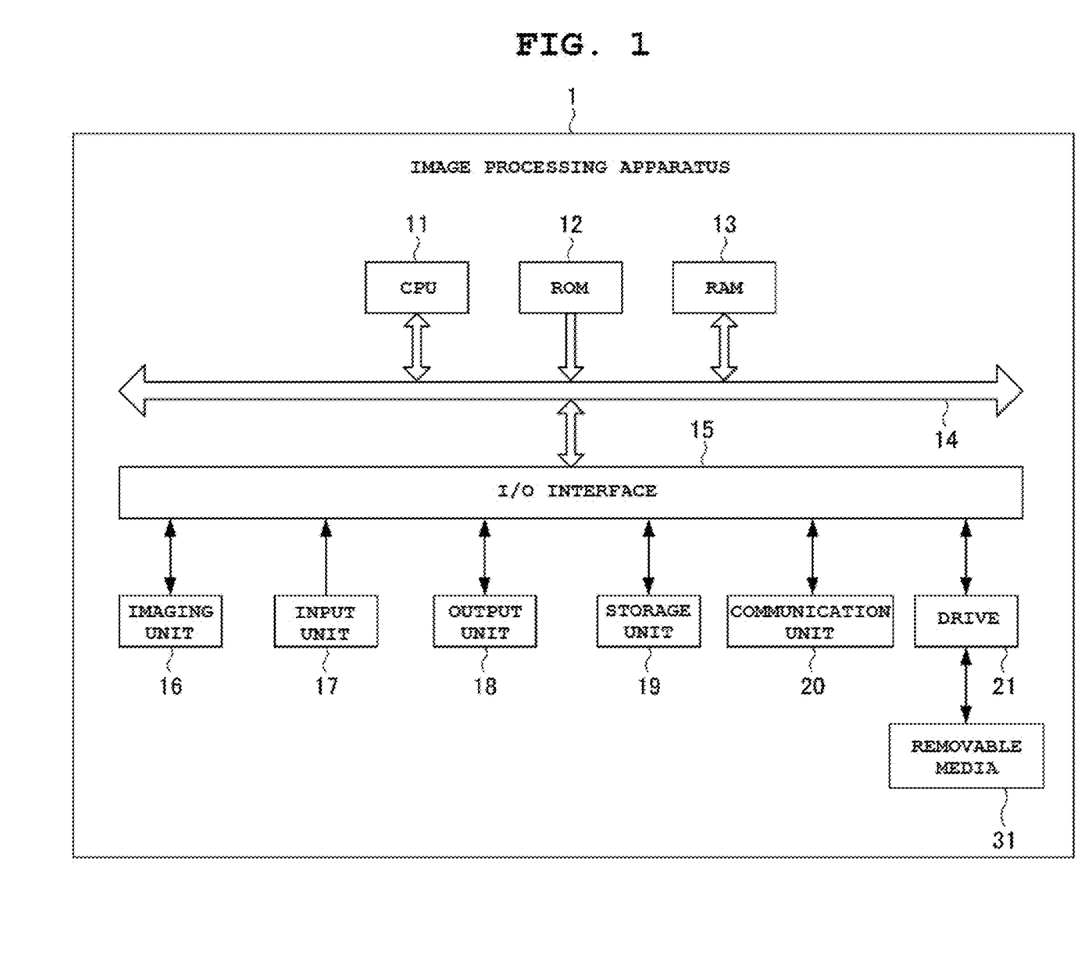
FIG. 1 is a block diagram showing a hardware configuration of an image processing apparatus according to an embodiment of the present invention.

FIG. 1 is a block diagram showing a hardware configuration of an image processing apparatus according to an embodiment of the present invention.

For example, the image processing apparatus 1 is realized by a digital camera.

The image processing apparatus 1 includes a CPU (Central Processing Unit) 11, a ROM (Read Only Memory) 12, a RAM (Random Access Memory) 13, a bus 14, an I/O interface 15, an imaging unit 16, an input unit 17, an output unit 18, a storage unit 19, a communication unit 20, and a drive 21.

The CPU 11 performs various processes in accordance with programs stored in the ROM 12 or loaded in the RAM 13 from the storage unit 19.

In the RAM 13, there are stored data necessary for the CPU 11 to perform various processes, and the like.

The CPU 11, the ROM 12 and the RAM 13 are connected to each other via the bus 14. The I/O interface 15 is also connected to the bus 14. The imaging unit 16, the input unit 17, the output unit 18, the storage unit 19, the communication unit 20, and the drive 21 are connected to the I/O interface 15.

The imaging unit 16 includes an optical lens unit and an image sensor (not shown in the drawing).

The optical lens unit includes lenses for collecting light to photograph a subject, for example, a focus lens, a zoom lens, and the like.

The focus lens forms an image of a subject on a light-receiving surface of the image sensor. The zoom lens freely changes the focal length within a predetermined range.

Further, the optical lens unit is provided with a peripheral circuit to adjust setting parameters such as focusing, exposure, white balancing, and the like, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. A subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE performs various signal processing operations such as A/D (Analog/Digital) conversion on the analog image signals. Digital signals are generated by the signal processing operations and output as output signals of the imaging unit 16.

The output signals of the imaging unit 16 are hereinafter referred to as "image data". After predetermined signal processing, the image data is supplied to the CPU 11, an image processing unit (not shown in the drawing), or the like.

The input unit 17 includes various buttons and a variety of information is input via the input unit 17 in response to a user's operations.

The output unit 18 includes a display device, a speaker, or the like, and outputs images or voices.

The storage unit 19 includes a hard disk, a DRAM (Dynamic Random Access Memory), or the like and various image data is stored in the storage unit 19.

The communication unit 20 controls communication with different devices (not shown in the drawing) via a network such as Internet.

A removable media 31 including a magnetic disk, an optical disk, a magneto-optical disc, a semiconductor memory, or the like, is mounted on the drive 21. A program read out from the removable media 31 by the drive 21 is installed in the storage unit 19 as necessary. Similarly to the storage unit 19, the removable media 31 stores various data such as the image data stored in the storage unit 19.

The image processing apparatus 1 configured as described above has a function of generating a time-lapse moving image. The term "time-lapse moving image" as used herein means a moving image produced by shortening intervals of images taken at predetermined time intervals (hereinafter, referred to as "component images") on a time axis.

Further, the image processing apparatus 1 according to the present embodiment has a function of generating time-lapse moving images by two different generating methods, i.e. a moving-picture based generating method using frame images obtained by shooting a moving-picture as component images and a still-picture based generating method using still pictures obtained by still picture photography as component images.

A time-lapse moving image produced by using frame images obtained by shooting a moving-picture by applying a conventional moving-picture shooting technology which has been widely used, as component images (hereinafter, briefly referred to as a "moving-picture based time-lapse moving image") is characterized by a short shooting time interval due to high speed processing. Further, by using this characteristic, it is possible to generate a time-lapse moving image showing no awkward motion when being played back even in the case of shooting a scene in which a subject such as a fast moving car disappears shortly from the screen or a scene of which subject is a person moving relatively slowly, for example.

A time-lapse moving image produced by using still pictures as component images by applying a conventional still picture taking technology which has been widely used (hereinafter, briefly referred to as a "still-picture based time-lapse moving image") is characterized by high definition while high speed processing comparable to the "moving-picture based time-lapse moving image" cannot be achieved.

Now, a method for generating each of the moving-picture based time-lapse moving image and the still-picture based time-lapse moving image is explained.

Figure 2:
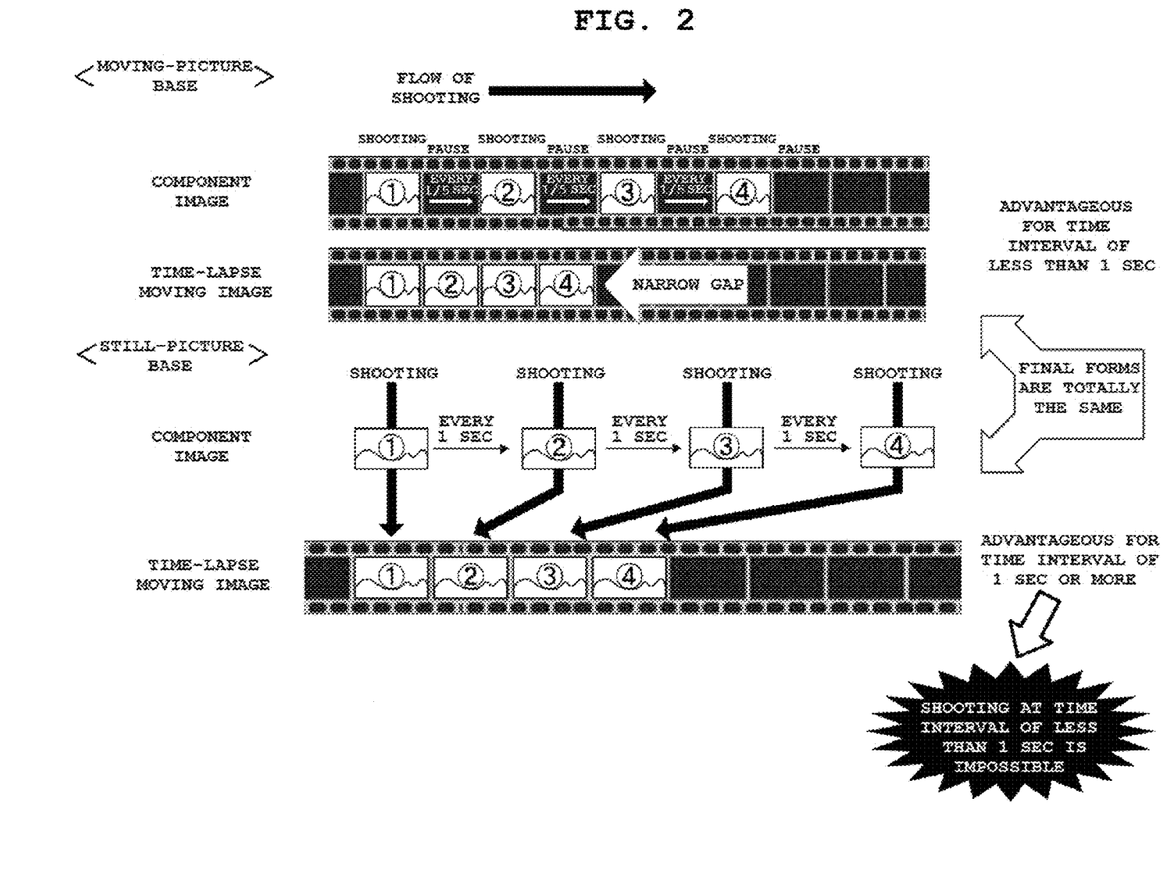
FIG. 2 is a schematic diagram showing a method for generating a time-lapse moving image according to an embodiment of the present invention.

FIG. 2 is a schematic diagram showing a method for generating a time-lapse moving image according to the embodiment of the present invention.

The moving-picture based time-lapse moving image is generated by executing moving-picture processing such as connection and compression on a group of component images that are a plurality of images obtained from a moving-picture produced by shooting one frame at every predetermined time interval.

More specifically, in the case of generating a time-lapse moving image of a time interval of ⅕ second, for example, four frame images obtained by shooting a moving-picture at a time interval of ⅕ second are used as component images as shown in FIG. 2. In other words, shoot and pause are repeated for every frame and four frame images each of which has the duration of ⅕ second are obtained as component images. By compressing (or shortening) the pause time between the component images, a time-lapse moving image is generated.

Since the frame images, which are obtained by repeating shoot and pause at every time interval corresponding to one frame, are used as component images of the moving-picture based time-lapse moving image, it is possible to change the shooting interval by changing the frame rate.

According to a different concept, a moving-picture based time-lapse moving image is generated by thinning out frame images obtained by shooting a moving-picture continuously, narrowing gaps between the remaining frame images and connecting the remaining frame images. In other words, a moving-picture based time-lapse moving image can be generated by thinning out a series of images of a moving-picture and compressing (or shortening) time intervals of the remaining images.

The image processing apparatus 1 according to the present embodiment can generate a moving-picture based time-lapse moving image characterized by a short shooting time interval by using the generating methods as described above.

Further, a still-picture based time lapse moving image is generated by connecting still pictures obtained by shooting at predetermined time intervals which are component images.

More specifically, in the case of generating a still-picture based time-lapse moving image of a time interval of one second, for example, four still pictures obtained by shooting at a time interval of one second are connected to generate the time-lapse moving image and the four still pictures are component images of the time-lapse moving image.

The image processing apparatus 1 according to the present embodiment can generate a still-picture based time-lapse moving image characterized by higher definition than the moving-picture based time-lapse moving image by using the generating method as described above.

The image processing apparatus 1 of the present embodiment generates a time-lapse moving image with changing generating methods according to shooting scenes by adding characteristics of time-lapse moving images of different bases.

Figure 3:
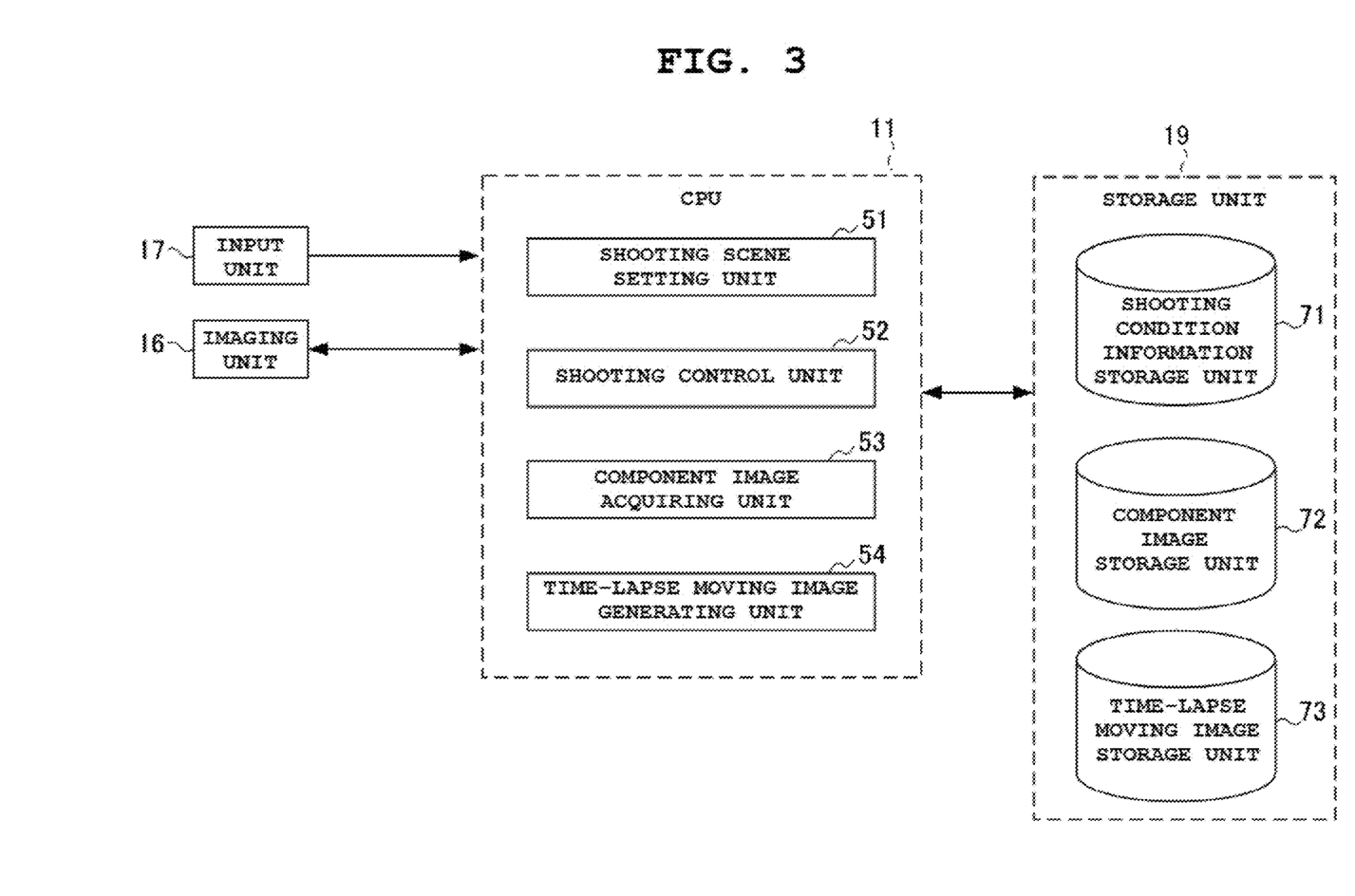
FIG. 3 is a functional block diagram showing a functional configuration of the image processing apparatus of FIG. 1 for performing a time-lapse moving image generating process.

FIG. 3 is a functional block diagram showing a functional configuration of the image processing apparatus 1 for performing time-lapse moving image generating process.

The time-lapse moving image generating process as used herein means a series of operations for generating a moving-picture based time-lapse moving image or a still-picture based time-lapse moving image according to set shooting scenes.

As shown in FIG. 3, a shooting scene setting unit 51, a shooting control unit 52, a component image acquiring unit 53, and a time-lapse moving image generating unit 54 of the CPU 11 function for the time-lapse moving image generating process.

In an area of the storage unit 19, a shooting condition information storage unit 71, a component image storage unit 72, and a time-lapse moving image storage unit 73 are configured.

In the shooting condition information storage unit 71, information of shooting conditions necessary for a time-lapse moving image (hereinafter, referred to as "shooting condition information") is stored. More specifically, the shooting condition information includes shooting intervals corresponding to a shooting scene, exposure time, playback time of the time-lapse moving image, or the like.

In the present embodiment, a shooting scene table showing the shooting condition information is stored in the shooting condition information storage unit 71.

Figure 4:
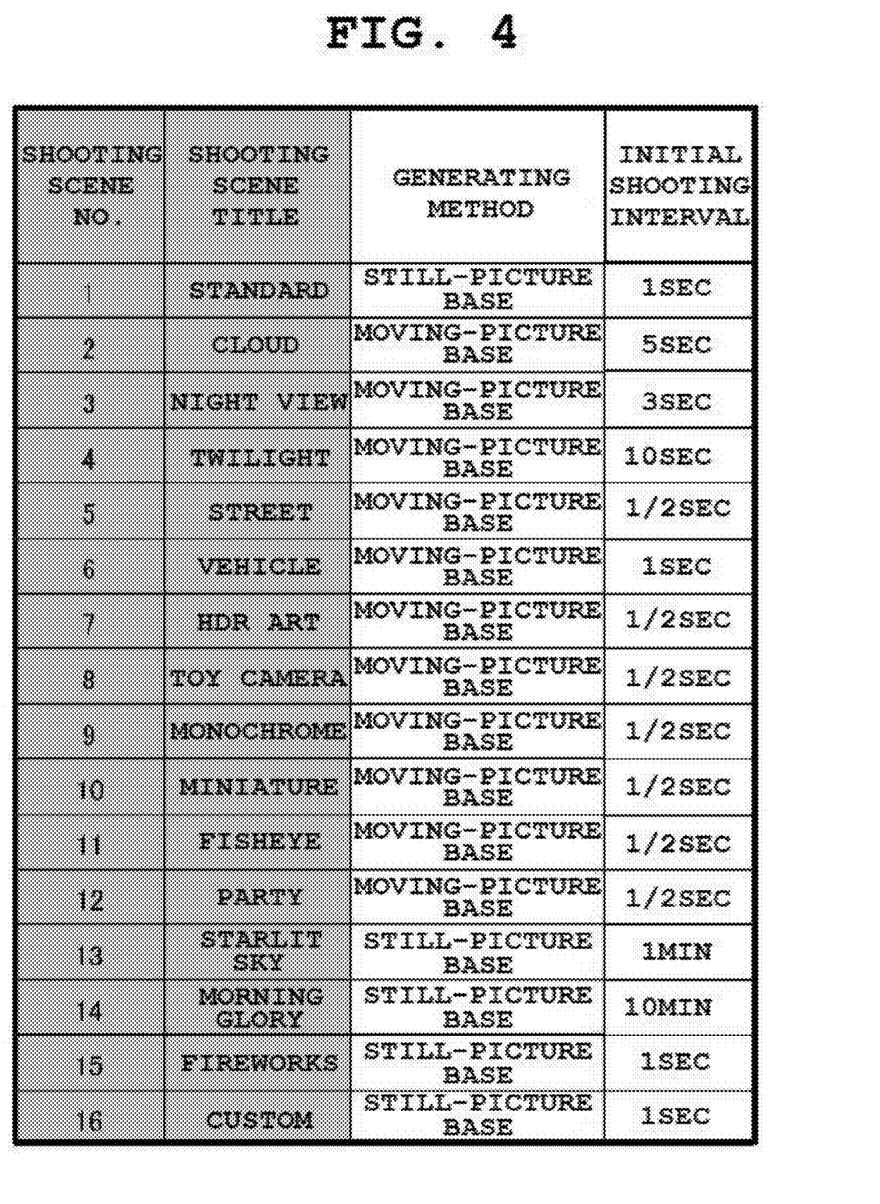
FIG. 4 is a drawing for explanation of a shooting scene table.

Now, the shooting scene table is explained. FIG. 4 is a drawing for explanation of the shooting scene table.

As shown in FIG. 4, in the shooting scene table, "Shooting Scene No." corresponds to "Shooting Scene Title", "Generating Method" indicating a time-lapse moving image generating method and "Initial Shooting Interval" indicating a shooting time interval of initial setting.

The "Generating Method" and the "Initial Shooting Interval" are set considering characteristics of each shooting scene.

More specifically, shooting scenes corresponding to the "Generating Method" of still-picture base are "Standard" and "Starlit Sky" to "Custom" and shooting scenes corresponding to the "Generating Method" of moving-picture base are "Cloud" to "Party".

Thus, the image processing apparatus 1 can generate a time-lapse moving image proper to a shooting scene by selecting a generating method according to the shooting scene.

Returning to FIG. 3, the component image storage unit 72 stores component images which are frame images or still pictures forming a time-lapse moving image. In the present embodiment, the component image storage unit 72 stores a moving picture or still pictures output from the imaging unit 16.

The time-lapse moving image storage unit 73 stores data of the generated moving-picture based time-lapse moving image or still-picture based time-lapse moving image.

Based on a shooting scene selected by a user, the shooting scene setting unit 51 sets parameters in accordance with the shooting scene with reference to the shooting scene table stored in the shooting condition information storage unit 71.

More specifically, the shooting scene setting unit 51 sets parameters such as a time-lapse moving image generating method, a shooting interval, a shooting period, and the like with reference to the shooting scene table as shown in FIG. 4.

The shooting control unit 52 controls the imaging unit 16 based on the parameters set by the shooting scene setting unit 51.

For the generating method of a moving-picture based time-lapse moving image, the shooting control unit 52 outputs frame images by shooting a moving picture at the set shooting intervals. For the generating method of a still-picture based time-lapse moving image, the shooting control unit 52 outputs still pictures taken at the set shooting intervals.

The component image acquiring unit 53 acquires frame images or still pictures output from the imaging unit 16 as component images. Then, the component image acquiring unit 53 allows the acquired component images to be stored in the component image storage unit 72.

The time-lapse moving image generating unit 54 generates a still-picture based or moving-picture based time-lapse moving image by executing moving image processing on the component images stored in the component image storage unit 72. Then, the time-lapse moving image generating unit 54 allows the generated time-lapse moving image to be stored in the time-lapse moving image storage unit 73. Here, the moving image processing as used herein means processing for forming a time-series of component images by sequentially connecting frame images or still pictures, each of which is acquired at every shooting interval, and compressing pause time between every two frame images or still pictures to make a moving image. The frame images or still pictures are component images (i.e. a group of component images) of the moving image. Then a still-picture based or a moving-picture based time-lapse moving image is generated by adding information to a header or an Exif (Exchangeable image file Format) area to produce one moving image file including the group of component images.

Figure 5:
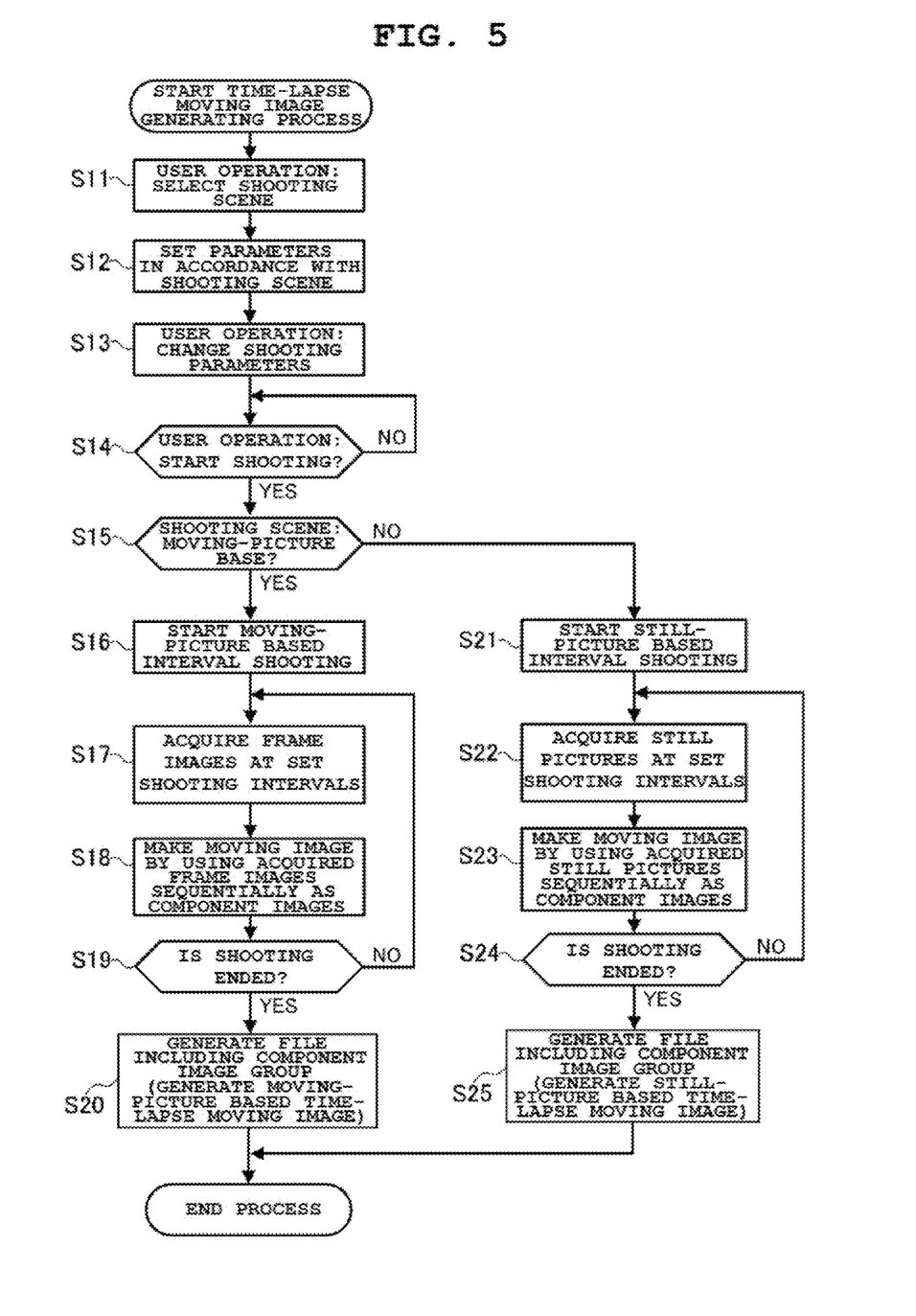
FIG. 5 is a flow chart for explaining the time-lapse moving image generating process performed by the image processing apparatus of FIG. 1 including the functional configuration shown in FIG. 3.

FIG. 5 is a flow chart for explaining the time-lapse moving image generating process performed by the image processing apparatus 1 of FIG. 1 including the functional configuration shown in FIG. 3.

The time-lapse moving image generating process is started by an operation to start the process input by the user to the input unit 17.

At Step S11, the shooting scene setting unit 51 receives selection of a shooting scene by the user through the input unit 17.

At Step S12, the shooting scene setting unit 51 refers to the shooting scene table (FIG. 4) stored in the shooting condition information storage unit 71 and sets parameters in accordance with the shooting scene selected by the user.

At Step S13, the shooting scene setting unit 51 receives change of the parameters of the shooting scene input by the user through the input unit 17.

For the still-picture base, the shooting interval should not be changed to less than one second which the still-picture base cannot deal with.

At Step S14, the shooting control unit 52 determines whether or not an operation to start shooting is input by the user through the input unit 17.

In the case that no operation to start shooting is input, the determination at Step S14 is "NO" and the image processing apparatus 1 stands by until an operation to start shooting is input.

In the case that an operation to start shooting is input, the determination at Step S14 is "YES" and the process proceeds to Step S15.

At Step S15, the shooting control unit 52 determines whether to generate a moving-picture based time-lapse moving image from the selected scene.

In the case of the still-picture base not the moving-picture base, the determination at Step S15 is "NO" and the process proceeds to Step S21. The steps following Step S21 will be described later.

In the case of the moving-picture base, the determination at Step S15 is "YES" and the process proceeds to Step S16.

At Step S16, the shooting control unit 52 starts moving-picture based interval shooting. In other words, the shooting control unit 52 starts interval shooting so as to shoot a moving picture at a predetermined shooting time interval.

Although the shooting scene table of FIG. 4 does not describe, a shooting time interval which is one of the parameters is also set in accordance with the selected shooting scene.

At Step S17, the component image acquiring unit 53 acquires the moving picture (one-frame images) from the imaging unit 16 at the set shooting time interval.

At Step S18, the time-lapse moving image generating unit 54 makes a moving image by sequentially connecting the acquired frame images which are component images. More specifically, the time-lapse moving image generating unit 54 generates a moving image including a component image group which is a time-series of the component images obtained by sequentially connecting the frame images each of which is acquired at every shooting interval and compressing time period during which shooting is paused between every two frame images. Then, the time-lapse moving image generating unit 54 allows the moving image formed from the component image group consisting of the plurality of frame images to be stored in the component image storage unit 72.

At Step S19, the CPU 11 determines whether or not the shooting is ended. More specifically, the CPU 11 determines whether or not an operation to end the shooting is input to the input unit 17.

In the case that the shooting is not ended, the determination at Step S19 is "NO" and the process returns to Step S17 and repeats Steps S17 and S18.

In the case that the shooting is ended, the determination at Step S19 is "YES" and the process proceeds to Step S20.

At Step S20, the time-lapse moving image generating unit 54 generates a file including the component image group made as a moving image by shortening time intervals between the frame images and generates a moving-picture based time-lapse moving image. More specifically, the time-lapse moving image generating unit 54 performs processing such as addition of information to a header or an Exif area to produce an electronic file to handle the moving image including the component image group as one moving image file in order to generate a moving-picture based time-lapse moving image. Then, the time-lapse moving image generating unit 54 allows the generated moving-picture based time-lapse moving image to be stored in the time-lapse moving image storage unit 73.

Then, the time-lapse moving image generating process is ended.

At Step S21, the shooting control unit 52 starts still-picture based interval shooting. In other words, the shooting control unit 52 starts interval shooting so as to shoot still pictures at a predetermined shooting time interval.

Although the shooting scene table of FIG. 4 does not describe, a shooting time interval which is one of the parameters is also set in accordance with the selected shooting scene.

At Step S22, the component image acquiring unit 53 acquires the still pictures from the imaging unit 16 at the set shooting time interval.

At Step S23, the time-lapse moving image generating unit 54 makes a moving image by sequentially connecting the acquired still pictures which are component images. More specifically, the time-lapse moving image generating unit 54 makes a moving image including a component image group which is a time-series of the component images obtained by sequentially connecting the still pictures each of which is acquired at every shooting interval. Then, the time-lapse moving image generating unit 54 allows the moving image formed from the component image group consisting of the plurality of still pictures to be stored in the component image storage unit 72.

At Step S24, the CPU 11 determines whether or not the shooting is ended. More specifically, the CPU 11 determines whether or not an operation to end the shooting is input to the input unit 17.

In the case that the shooting is not ended, the determination at Step S24 is "NO" and the process returns to Step S22 and repeats Steps S22 and S23.

In the case that the shooting is ended, the determination at Step S24 is "YES" and the process proceeds to Step S25.

At Step S25, the time-lapse moving image generating unit 54 generates a file including the component image group made as a moving image by connecting the component images and generates a still-picture based time-lapse moving image. More specifically, the time-lapse moving image generating unit 54 performs processing such as addition of information to a header or an Exif area to produce an electronic file to handle the moving image including the component image group as one moving image file in order to generate a still-picture based time-lapse moving image. Then, the time-lapse moving image generating unit 54 allows the generated still-picture based time-lapse moving image to be stored in the time-lapse moving image storage unit 73.

Then, the time-lapse moving image generating process is ended.

Thus, although the moving-picture base and the still-picture base of the image processing apparatus 1 are different in methods of acquiring component images (Steps S17 and S22) and methods of generating time-lapse moving images (Steps S18 and S23), the resultant products obtained as a form of file are equivalent.

Further, according to the image processing apparatus 1, it is possible to generate a time-lapse moving image by using moving-picture based component images in the case that a shooting interval of less than one second is desirable to obtain effectively a time-lapse moving image in the case of shooting a scene in which a subject such as a fast moving car disappears shortly from the screen, a scene of which subject is a person moving relatively slowly, or the like. Furthermore, in the case of shooting usual scenes of which shooting interval is longer than or equal to one second, the image processing apparatus 1 generates a still-picture based time-lapse moving image.

By configuring the image processing apparatus 1 as described above, it is possible to provide a time-lapse moving image appropriate to a shooting scene and users can enjoy time-lapse in various scenes.

Modified Embodiment

As another feature of the still-picture base, low-power processing is possible in the case that a shooting time interval is relatively long. In the case that a shooting time interval is longer than or equal to ten seconds, sleep processing for turning on or off the display is operated. In the case that a shooting time interval is longer than or equal to one minute, functions except minimum requisites such as a clock function are turn off to enable low-power processing.

The image processing apparatus 1 configured as above includes the shooting scene setting unit 51, the component image acquiring unit 53, and the time-lapse moving image generating unit 54.

The shooting scene setting unit 51 sets a shooting interval according to shooting situations or shooting setting and selects one of different methods for generating a time-lapse moving image from a plurality of images obtained at the set shooting interval according to shooting situations or shooting setting.

The component image acquiring unit 53 obtains a plurality of component images for forming a time-lapse moving image based on the time-lapse moving image generating method set by the shooting scene setting unit 51.

The time-lapse moving image generating unit 54 generates a time-lapse moving image by using the plurality of component images obtained by the component image acquiring unit 53 based on the set time-lapse moving image generating method.

Therefore, the image processing apparatus 1 can properly generate a time-lapse moving image regardless of shooting situations because it sets the time-lapse moving image generating method differently according to shooting situations or shooting setting.

The shooting scene setting unit 51 sets the time-lapse moving image generating method according to shooting scenes corresponding to shooting condition information showing the shooting situations or the shooting setting.

Therefore, the image processing apparatus 1 can properly generate a time-lapse moving image proper to a shooting scene regardless of shooting situations.

Further, the time-lapse moving image generating method performed by the image processing apparatus 1 includes the generating method which uses images obtained by picking out frame images of a moving picture which is being shot at every predetermined shooting interval.

Therefore, as the image processing apparatus 1 can properly generate a time-lapse moving image regardless of shooting situations because it can select the generating method which can generate a time-lapse moving image of short shooting intervals, for example. Further, it is possible to apply a conventional moving-picture shooting technology.

Further, the time-lapse moving image generating method of the image processing apparatus 1 is configured to use a moving picture of which frame rate is changed according to shooting intervals.

Therefore, the image processing apparatus 1 can change the shooting interval by changing frame rate and realize a method for generating a time-lapse moving image of which shooting interval can be easily changed.

Furthermore, the time-lapse moving image generating method of the image processing apparatus 1 is configured to generate a time-lapse moving image by shortening time intervals between frame images of a moving picture obtained by picking out the frame images of the moving picture.

Therefore, the image processing apparatus 1 can easily realize a method for generating a time-lapse moving image of which shooting interval is short.

In addition, the time-lapse moving image generating method of the image processing apparatus 1 is configured to obtain still pictures at predetermined shooting intervals.

Therefore, the image processing apparatus 1 can generate a time-lapse moving image of high definition. Further, the image processing apparatus 1 enables low-power control.

The image processing apparatus 1 can also apply a conventional still picture taking technology.

Further, the time-lapse moving image generating method of the image processing apparatus 1 is configured to connect the obtained still pictures to generate a time-lapse moving image.

Therefore, the image processing apparatus 1 can easily generate a time-lapse moving image of high definition.

Further, the image processing apparatus 1 includes the component image acquiring unit 53 and the shooting control unit 52.

The component image acquiring unit 53 can acquire images forming a moving picture by picking out the images at predetermined shooting intervals or still pictures at predetermined shooting intervals.

The shooting control unit 52 selects the moving-picture base or the still-picture base according to a set shooting interval as a method for acquiring component images at set shooting intervals.

Therefore, the image processing apparatus 1 can easily generate a time-lapse moving image of short time intervals which is difficult to obtain by a method of shooting still pictures intermittently. Further, the image processing apparatus 1 can apply a conventional moving-picture shooting technology.

In the case that a shooting interval is shorter than a predetermined time, the shooting control unit 52 selects a moving picture as a method for acquiring images at set shooting intervals.

Therefore, the image processing apparatus 1 can change the shooting interval by changing frame rate and easily realize a method for generating a time-lapse moving image of a short shooting interval.

Further, the present invention is not limited to the embodiments described above and any modifications or alternatives which can achieve the objects of the invention fall within the scope of the invention.

In addition, some embodiments may be configured to generate a moving-picture based or a still-picture based time-lapse moving image according to exposure time measured by AE (Automatic Exposure). For example, in the case that the exposure time is short, the image processing apparatus 1 selects the moving-picture base.

In this case, the shooting situation includes the measured exposure time.

Although a shooting scene can be set by a user in the embodiments described above, the present invention is not limited to this configuration. For example, the image processing apparatus 1 may identify a shooting environment around the apparatus and automatically set the shooting scene according to the shooting environment.

While the embodiments described above perform compression encoding or connection-compression encoding sequentially at every shooting, it is also possible to temporarily store component images and perform compression encoding or connection-compression encoding at a time after shooting is ended.

Further, although the moving-picture based time-lapse moving image is generated by using a moving picture (one-frame images) shot at predetermined time intervals in the embodiments described above, the present invention is not limited to this configuration. For example, a moving-picture based time-lapse moving image may be generated by extracting frame images corresponding to predetermined time intervals from a moving picture shot for a predetermined time period to use the frame images as component images or by deleting frame images of a moving picture other than frame images corresponding to predetermined time intervals to thin out the frame images.

Further, while the embodiments described above use a moving picture or still pictures output from the imaging unit 16 to obtain component images, the present invention is not limited to this configuration. It is also possible to acquire component images including information indicating shooting time intervals and the like from the outside.

While the embodiments described above include two kinds of time-lapse moving image generating methods, i.e. the moving-picture base and the still-picture base, it is also possible to include just one of the moving-picture based and the still-picture based time-lapse moving image generating methods according to selectable shooting scenes.

Further, while the embodiments described above explain two kinds of time-lapse moving image generating methods, i.e. the moving-picture base and the still-picture base, the present invention may be used as two kinds of methods for acquiring a plurality of images at set shooting intervals, i.e. a moving-picture based and a still-picture based image acquiring methods, without generating a time-lapse moving image.

Further, in the embodiments described above, the present invention has been applied to a digital camera as an example of the image processing apparatus 1 without limitation.

For example, the present invention can be applied to general electronic devices having a time-lapse moving image function. Specifically, the present invention can be applied to a notebook type personal computer, a printer, a television, a video camera, a portable navigation device, a mobile phone, a smart phone, a portable game device, and the like.

The sequence of the processes described above can be executed by hardware or software.

In other words, the functional configuration shown in FIG. 3 is merely an example and the present invention is not limited thereto. The image processing apparatus 1 suffices if it has a function for performing a sequence of the steps as a whole. Functional blocks to use to implement this function are not limited to the embodiment of FIG. 3.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program consists of not only the removable media 31 shown in FIG. 1 which is distributed separately from the apparatus's main body to provide it to users, but also a storage medium or the like which is provided to users in a state of being incorporated in the apparatus's main body in advance. The removable media 31 includes, for example, a magnetic disk (including a floppy disk), an optical disc, a magneto-optical disk, or the like. For example, the optical disc includes a compact disk-read only memory (CD-ROM), a digital versatile disk (DVD), a Blu-ray (Registered Trademark) disc, or the like. The magneto-optical disk includes a Mini-Disk (MD), or the like. In addition, the storage medium which is provided to the users in a state of being incorporated in the apparatus's main body in advance includes, for example, the ROM 12 in FIG. 1 in which a program is recorded, a hard disk included in the storage unit 19 in FIG. 1, or the like.

Further, in the description presented here, the steps describing a program recorded in a recording medium include not only processes to be executed serially in time in order, but also processes which are not necessarily executed serially in time but in a parallel manner or individually.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An image processing apparatus comprising:
   a first image obtaining means for obtaining images by picking out an image from images forming a moving picture, which is being shot by a moving picture shooting means for shooting a moving picture, at every predetermined shooting interval;
   a second image obtaining means for obtaining still pictures shot by a still picture shooting means for shooting a still picture at every predetermined shooting interval; and
   a selecting means for selecting one of the first image obtaining means and the second image obtaining means according to a set shooting interval as a way to obtain images for forming a time-lapse moving image at the set shooting interval.

2. The image processing apparatus of claim 1, wherein the set shooting interval is set by selecting a shooting scene corresponding to shooting conditions including the shooting interval.

3. The image processing apparatus of claim 1, wherein the selecting means selects the first image obtaining means as the way to obtain images at the set shooting interval in a case that the set shooting interval is shorter than a predetermined time.

4. The image processing apparatus of claim 1, further comprising a generating means for generating a time-lapse moving image from a plurality of images which are obtained by the first image obtaining means by picking out them from the images forming the moving picture in a case that the first image obtaining means is selected by the selecting means, or from a plurality of still pictures shot at the predetermined shooting interval which are obtained by the second image obtaining means in a case that the second image obtaining means is selected by the selecting means.

5. The image processing apparatus of claim 4, wherein the generating means generates a time-lapse moving image by narrowing gaps between images remaining after thinning out a plurality of images forming a moving picture continuously shot by the moving picture shooting means and connecting the remaining images.

6. The image processing apparatus of claim 4, wherein the generating means generates a time-lapse moving image by connecting the plurality of still pictures obtained by the second image obtaining means to use them as component images of the time-lapse moving image.

7. An image processing method performed by an image processing apparatus comprising:
   first image obtaining processing for obtaining images by picking out an image from images forming a moving picture, which is being shot by a moving picture shooting means for shooting a moving picture, at every predetermined shooting interval;
   second image obtaining processing for obtaining still pictures shot by a still picture shooting means for shooting a still picture at every predetermined shooting interval; and
   selecting processing for selecting one of the first image obtaining processing and the second image obtaining processing according to a set shooting interval as a way to obtain images for forming a time-lapse moving image at the set shooting interval.

8. A non-transitory computer-readable recording medium storing a program executable a computer, which controls an image processing apparatus, to perform functions comprising:
   a first image obtaining function for obtaining images by picking out an image from images forming a moving picture, which is being shot by a moving picture shooting means for shooting a moving picture, at every predetermined shooting interval;
   a second image obtaining function for obtaining still pictures shot by a still picture shooting means for shooting a still picture at every predetermined shooting interval; and
   a selecting function for selecting one of the first image obtaining function and the second image obtaining function according to a set shooting interval as a way to obtain images for forming a time-lapse moving image at the set shooting interval.

* * * * *